(12) United States Patent
Brexel et al.

(10) Patent No.: US 6,824,046 B2
(45) Date of Patent: Nov. 30, 2004

US006824046B2

(54) CASH DISPENSER

(75) Inventors: Dirk Brexel, Geseke (DE); Andrea Carozzi, Delbruck (DE); Hans-Gunther Voss, Paderborn (DE); Gunter Holland-Letz, Paderborn (DE)

(73) Assignee: Wincor Nixdorf GmbH & Co. KG, Paderhorn (DE)

( * ) Notice: Subject to any disclaimer, the term of this patent is extended or adjusted under 35 U.S.C. 154(b) by 62 days.

(21) Appl. No.: 10/181,649

(22) PCT Filed: Jan. 24, 2001

(86) PCT No.: PCT/EP01/00769
§ 371 (c)(1),
(2), (4) Date: Jul. 18, 2002

(87) PCT Pub. No.: WO01/54078
PCT Pub. Date: Jul. 26, 2001

(65) Prior Publication Data
US 2003/0000957 A1 Jan. 2, 2003

(30) Foreign Application Priority Data

Jan. 24, 2000 (DE) .......................................... 100 02 841
Aug. 1, 2000 (DE) .......................................... 100 37 465

(51) Int. Cl.[7] ............................................. G06F 17/60
(52) U.S. Cl. ........................................ 235/379; 705/35
(58) Field of Search ................................ 235/379, 380; 705/35, 42; 109/45

(56) References Cited

U.S. PATENT DOCUMENTS 4,337,864 A * 7/1982 McLean ..................... 209/534
5,615,625 A * 4/1997 Cassidy et al. ................ 109/45
6,006,989 A * 12/1999 Ademmer et al. ........... 235/379

FOREIGN PATENT DOCUMENTS

| DE | 34 22 739 A1 | 12/1984 | ............. G07D/1/00 |
| DE | 195 36 481 A1 | 4/1997 | .......... G07D/13/00 |
| DE | 694 19 016 T2 | 10/1999 | ............. E05G/1/00 |
| EP | 0 692 599 A1 | 7/1994 | ............. E05G/1/00 |
| EP | 0 965 955 A2 | 12/1999 | .......... G07D/11/00 |
| WO | 93/02435 | 2/1993 | .......... G08B/15/02 |
| WO | 97/13225 | 4/1997 | .......... G07D/11/00 |
| WO | 01/06464 A1 | 1/2001 | .......... G07D/11/00 |

* cited by examiner

Primary Examiner—Diane I. Lee
Assistant Examiner—Lisa M. Caputo
(74) Attorney, Agent, or Firm—McCormick, Paulding & Huber LLP (57) ABSTRACT

A cash dispenser for dispensing bank notes includes a container for the secure storage, transport, and dispensing of bank notes. The cash dispenser includes a housing having a control panel and an output compartment for dispensing bank notes. The housing defines an opening for receiving a container removably positionable in the opening. The container defines a pass-through slot in a wall thereof for transferring bank notes between the container and the housing. Functional units disposed in the container include a bank note storage unit having a withdrawal device, a first bank note conveyor arranged between the bank note storage unit and the pass-through slot and a drive unit for driving the withdrawal device and the first bank note conveyor. A control unit disposed inside the container controls the functional units therein. A security mechanism invalidates banks notes stored in the container upon unauthorized manipulation of the container.

36 Claims, 7 Drawing Sheets

CASH DISPENSER

CROSS-REFERENCE TO RELATED APPLICATIONS

This application is entitled to the benefit of and incorporates by reference essential subject matter disclosed in International Application No. PCT/EP01/00769 filed on Jan. 24, 2001 and German Patent Application No. 100 02 841.1 filed on Jan. 24, 2000.

FIELD OF THE INVENTION

The present invention relates to a cash dispenser, for dispensing and receiving bank notes. In particular, the present invention is directed to a cash dispenser including a housing with a receiving space for at least one bank note storage unit, a dispensing mechanism associated with the storage unit for removing individual bank notes from the storage unit, a bank note transport mechanism for transporting the bank notes between the storage unit and a control panel of the cash dispenser, a power supply unit and a control mechanism for controlling the functions of the cash dispenser.

BACKGROUND OF THE INVENTION

There exists up to now no methods for positively securing cash from undesired access during the circulation of cash in commerce and banks. Security problems always appear at the interfaces, when for example cash must be removed from the safe system or must be resupplied to the cash dispenser.

Usually in cash dispensing/depositing machines, bank note containers or cassettes are used, which have to be filled or emptied in central loading or filling stations. For the stationary securing of cash at cash handling places and cash dispensers, strong boxes are used in which the bank note containers are placed. The transport of the bank note cassettes is carried out mostly through the use of valuables transport service performers. For this today, by regulation, professional associations in Germany are required to have an armored vehicle with three employees. The situation in other countries is analogous. Customarily one employee must watch the armored vehicle while the two others undertake a cassette exchange or refill cash on the spot. This high consumption of personnel and material is necessary to defend against attacks or to prevent manipulation by the cash deliverers themselves ("the four-eye principal"). Very high costs are connected with this type of cash security.

Based on the foregoing, the present invention has as its basic object the provision of a cash dispenser of the aforementioned kind which makes possible a gapless security of the cash circulation between the cash dispensers and the associated bank with low personnel and material expense.

SUMMARY OF THE INVENTION

This object is solved in accordance with the invention by a closable and lockable box shaped container containing at least one bank note storage unit, a first bank note conveyor which connects a withdrawal device with a pass-through slot in the container wall, a drive for the withdrawal device and for the first bank note conveyor, a first control unit for controlling the functional units enclosed in the container, and a security mechanism which upon unauthorized manipulation of the container makes the bank notes contained in it unusable, the receiving space of the housing of the cash dispenser for receiving the container being so formed that the housing contains a second bank note conveyor for connecting the pass-through slot of the container with the control panel as well as a second control unit for controlling the functional units connected to the housing, and the container having an interface connected with the drive and the first control unit in the container for connection of the same to the second control unit.

In the solution according to the invention, the container because of the security mechanism contained in it replaces the previously required strong box, the transport security trunk and the armored vehicle, and makes possible a gapless security process as well as a new concept in the construction of cash dispensers. The container forms a mobile strong box which as an encapsulated, closed unit can be quickly and securely connected with the stationary portion of the cash dispenser. Since the container because of the security mechanism contained in it need not be armored it can be handled by a single person. An armored vehicle is likewise not needed. Accordingly, this reduces the above-described expense and associated costs drastically.

EP 0 692 599 BI already describes indeed a system for the protected transport of articles such as checks, bank notes and the like with a security system containing container, which can be loaded into or removed from a docking station. The docking station has, in this case, however, only the function and opening and locking of the container without tripping into action the self-destruction mechanism. A removal of bank notes from the container without opening the same is neither mentioned nor are the there described means suited to making possible a use of the container in a cash dispenser.

Essential to the classification of the container as a mobile strong box is the fact that the single opening in the strong box wall is a pass-through slot for bank notes. All functional units which are necessary for pushing the withdrawn bank notes through the pass-through slot are arranged inside of the container. Along with the pass-through slot only through openings are required for conductors which connect the interface with the functional units inside of the container. Therefore, the interface for connecting the functional units contained by the container to the power supply unit of the cash dispenser can be so formed that the control conductors and the power supply conductors have to be guided through the container wall. The remainder of the container, however, is entirely closed. Either a bank note conveyor or a drive element (for example, a power take off shaft), must be inserted into the container from its outside. This entails a further opening in the upper surface of the container which cannot be sufficiently secured against manipulation. To prevent a control of the functional elements by a non-authorized person through the control conductors, it is advantageous if the communication between the first control unit of the container and the second control unit in the stationary portion of the cash dispenser is coded. In this way it is assured that the container can be emptied only by the cash dispenser with which it is associated. In the case of theft of the container, there exists no possibility of emptying it, without forceable opening, by the help of reconstructing the cash dispenser or the like.

The concept of a cash dispenser according to the invention makes it possible to on one hand design the container to be robust and compact and on the other hand to also be of light weight, so that it can be transported by one man. Since during the transport of the container large stretches and also height differences must be traversed it is advantageous if the container is connected with wheels so that it need not be carried all the time by the transport person. Advantageously, the container is arranged on an undercarriage and is adjustable relative to the undercarriage between a lower transport position and a lifted position, in which lifted position it is insertable into the receiving space of the cash dispenser. The undercarriage can be made somewhat like a sack carrier on which the container is adjustably guided. To more easily lift the container, the undercarriage can have arranged on it a lifting mechanism, such as for example, a gas spring or the like, which upon the opening of a latch lifts the container on the undercarriage or at least assists in such a lifting.

In the receiving space of the cash dispenser are advantageously provided guide elements intended to cooperate with complementary elements on the container, or on the undercarriage, which make possible an exact positioning of the container as well as especially an exact positioning of the interface relative to the corresponding connection station of the cash dispenser. Insofar as the container may be provided with a grip, the grip can be arranged pivotally or removably on the container so that it does not interfere with the closing of the receiving space. To be able to respectively supply or withdraw bank notes into and from the storage unit or storage units in the container, the container includes, in a way known in itself, a container body and a lid movable relative to the container body which is lockable relative to the container body by a lock, which lock is advantageously contact freely actuatable, to more easily distinguish between a permitted actuation of the lock and a mechanical manipulation attempt.

The container body and the lid can, for example, as is known in the case of cash trunks, be made of glass fiber reinforced plastic in which a very fine wire mesh is embedded. Damage to this wire mesh triggers the security mechanism, for example, an explosive mechanism by means of which a coloring material is dispersed into the container.

If the container includes several storage units for the reception of different types of bank notes, it is advantageous to associate with each storage unit its own withdrawal mechanism.

The security mechanism is advantageously contact freely actuatable and deactuatable and is also preferably triggerable by a remote control. The latter case is important if the bank note container in its entirety falls into unintended hands and one wishes to make its contents unusable before anyone really has the chance, by manipulation of the container, to gain access to its contents. In connection with this the container can, in a way known in itself, be provided with a location transmitter so that it, for example, can be found by way of a satellite positioning system and/or can be controlled as desired.

The security of the container is increased if the security mechanism is activated after its filling in a bank note filling station and remains uninterruptedly activated, and is also non-deactivatable, during its transport to and its movement into an out of the cash dispenser, as well as during its reverse transport to the bank note filling station, and can only be deactivated in the bank note filling station.

Alternatively to this, activation and deactivation of the security mechanism can also be accomplished by way of the control unit of the cash dispenser, with which it is associated, so that definite procedures can be used which in turn are securely stored in the data processing apparatus of the cash dispenser.

Preferably, the drive of the bank note conveyors located both in the container as well as in the cash dispenser are reversible with the storage unit in the container being designed for the dispensing and receipt of individual bank notes. If the storage unit is further associated with a mechanism for the ordered input of bank notes to the storage unit, the cash dispenser of the invention can be used for the dispensing and depositing of bank notes. Further, the container can also be automatically loaded and unloaded at a docking station without it having to be opened. This increases the security against dishonorable employees of the bank.

The storage unit can be formed to receive a stack of bank notes, with the withdrawal mechanism being formed, as is in itself well known, as a withdrawal and individualizing mechanism.

In another preferred embodiment, at least one of the storage units is formed as a winding store, having at least one storage band, which band is wound from a supply roll over a deflecting roll arranged near the pass-through opening to a winding core, and vis-a-vis windable from the winding core, with the winding core and the supply roll being drivable by a winding drive. A winding store has the advantage that no individualizing mechanism is necessary for the withdrawal and individualizing of the bank notes, since the bank notes lie individually between the band layers of the winding store. At the same time, the danger of a plural dispensing is avoided so that also a corresponding control mechanism for testing for plural withdrawal can be eliminated. Finally the use of a winding store has the advantage that bank notes without great expense cannot only be removed from the storage unit, but can also be inserted into it.

In a preferred embodiment of the winding store, the winding core has two spools which are arranged axis parallel at a spacing from one another and of which at least one is coupable with the winding drive, with the storage band passing around both spools in common on their circumferential areas which face away from one another. The winding core is therefore not cylindrical, but has the form of a flattened elongated oval so that the winding store formed by such a winding core can optimally fill a customary rectangularly shaped housing intended for receiving a bank note stack. This simplifies the combination of the winding store with storage units of other types of construction, and their common space saving accommodation in the container.

The previously described winding store has, in comparison to customary winding stores, the advantage that the bank notes stored in the winding store are not constantly bent, but are also stored on the straight sections between the two spools. If bank notes become wound for long times on one of the spools, they obtain a retained curvature which is injurious to their being handled in a cash dispenser. To avoid this curvature in the winding store of the invention, the winding store can, for example, be constantly moved several steps forwardly or rearwardly so as to move bank notes from the curved portions of the winding to the straight portions and back again and thereby to avoid a permanent curvature of the stored bank notes.

It is sufficient that one end of the storage band be fastened to one of the two spools and that the band passes at least once around the winding core, before the delivery of bank notes is begun. The winding core can, however, also be so formed that the two spools are surrounded by one endless band which forms the circumferential envelope of the winding core, onto which endless band the storage band is windable. This is at least advantageous if the storage band is of only one layer.

The storage band can, however, include two individual foils which are unwound as a double layer from the supply roll and which are guided to the output station of the storage unit by way of separated paths, whereby they after forming a bank note input/output gap they are again guided together as a double layer by a deflecting roll and are wound onto the winding core. In this solution the bank notes are not stored between the windings and the storage band running onto the winding, but are stored between the two individual foils of the storage band.

The container can in addition to the at least one bank note storage unit for the dispensing of bank notes also contain a collection compartment for bank notes to be taken back. One such collection or reject compartment serves to receive bank notes which indeed have been offered to the customer but not removed by the customer. Or the bank notes indeed may have been made ready for dispensing and then, however, because of an interruption in a transaction or because of some fault are not dispensed to the customer. These bank notes are, because of bookkeeping grounds, usually not again placed in the storage unit for the bank notes to be dispensed, but are instead deposited in such a collection compartment.

In customary cash dispensers the bank notes to be dispensed and also the collection compartment are customarily formed as secure cassettes. In the solution of the invention, this is no longer necessary. The storage unit and/or the collection compartment can be formed as simple drawers slidable into the container, with the storage unit having to be provided with only a pressing mechanism and a drive. Many of the previously customary cassette functional elements, which were required for the realization of a clean interface between the bank note cassettes and the individualizing units are no longer necessary in the case of the solution of the invention, such as, for example, flaps for the closing of the cassette openings, rearward pull bows, anti-repeat devices, control links, locks and the like. Therefore, the construction, material and financial expense for such bank note storage unit is substantially lowered. The drawers are, for example, guided on rails of a frame which is surrounded by the container walls, so that the guiding for the drawers need not be directly fastened to the container walls. The drawers can for exact positioning of the withdrawal mechanism have an arresting device and are preferably adjustable to accommodate different widths of bank notes.

The security mechanism can be so implemented that a bank note coloring or destroying unit is arranged above each of the drawers so that the bank notes in all storage units can be reached by the coloring or destroying mechanism and no dead angle for the effect of the security mechanism exists.

In most past dispensers the individual bank notes withdrawn from the bank note cassettes are subsequently assembled into a bundle which is offered to the customer in the output compartment of the control panel. The assembling mechanism, in which the individual bank notes are assembled into a bundle can be arranged at different locations of the transport path. Basically, there exists the possibility to place this assembly station in the container. In this case, the pass-through slot must be somewhat wider to permit the passage therethrough of a bundle of bank notes. To increase the security it is, however, advantageous if the pass-through slot remains as small as possible. Therefore, in a preferred embodiment of the invention, the assembly station is in the path of the second bank note conveyor, that is, it is arranged in the stationary portion of the cash dispenser. For the case that the bank notes must be again returned and transported to the collection compartment, either the bank notes of the bundle must again be individualized, so that the individual bank notes can be transported back to the collection compartment through the pass-through slot of the container, or the entire bundle is transported to the collection compartment. In this case, there naturally likewise appears the same problem as with the output of a bank note bundle, that is, that the pass-through slot must be of a corresponding width to allow passage of the bundle. Additionally, there arises also the difficulty that the relative stiff bank note bundle has to be deflected by a deflector with a relatively small radius to the collection compartment. On one hand, one desires therefore to do without an individualizing mechanism for individualizing the bank notes of the bundle to be taken back. On the other hand, however, the pass-through slot should be as small as possible and the bundle should be bendable about a small radius.

This problem is solved in accordance with the invention in that the second bank note conveyor has a first transport stretch with two belt drives the endless belts of which are directed parallel to one another and are driven by a drive roll in the same direction, and between which belts a bank note bundle is grasped and transported, as well as a drive mechanism for driving each belt drive and in that the belt drives at least in the direction from the control panel to the collection compartment are drivable at different speeds.

In the way proposed by the invention, the two belt drives which cooperate for the transport of the bank note bundle are driven at different speeds so that the bank note bundle is fanned. During the transport of the bank notes to the output compartment of the control panel, the two belt drives run at exactly the same speed so as to offer the bank notes to the customer in the output compartment with their edges arranged orderly into a bundle, and during the rear transport the bundle is fanned, whereby it becomes thinner and essentially more flexible and allows itself to be bent without problem about relatively small radii. Over a given length, the fanning can be increased as wished by multiple back and forth movement of the bundles.

A differential drive speed of the two belt drives can be accomplished in that the drive mechanism for each belt drive has its own individual motor, with at least one of the motors being controllable as to its speed.

The drive mechanism can, however, also as previously be effected with one motor with one of the two belt drives in one transport direction being coupable with the motor through a first drive train and in the other transport direction being coupable with the motor through a second drive train, with the second drive train having a different drive ratio in comparison to the first drive train.

In a practical embodiment of this solution, the drive roll of the first belt drive and an intermediate shaft parallel to it are rotationally fixedly coupled with the motor, while the drive roll of the second belt drive is connected with the first drive roll by a first one-way coupling and by way of a second one-way coupling, whose effective direction is opposite to that of the first one-way coupling, with the intermediate shaft standing in rotational moment transmitting connection.

The one-way couplings can be implemented in different ways. For example, one of the one-way couplings can be a latch-free running one or a clamping body-free running one and the other one-way coupling can be a slip coupling which in one direction makes possible a rotational moment transmission and in the other direction avoids a locking of the drive if two drive elements with different rotational speed meet with one another.

The taking up of the speed difference by a slip coupling, however, naturally loads the drive motor. If this is undesirable, the one-way couplings can also be wrap spring couplings made to have opposite effective directions with respect to one another. The wrap spring couplings tighten themselves onto the shaft, on which they are located, in the associated rotational direction, or wind themselves from the shaft to terminate the rotational moment transmission. The control of the wrap springs as a rule is achieved by means of a slide coupling with low rotational moment.

The first transport stretch can be coupled in a simple way with a subsequent two belt drive containing transport stretch, with each endless belt of the one belt drive being guided over the first drive roll and the endless belt of the second belt drive being guided over one drive roll which is located on the intermediate shaft. Since the first drive roll and the intermediate shaft are constantly driven at the same rotational speed, the two belt drives of this second transport stretch also run at the same speed, so that the bank note bundles on this second transport stretch are always transported in the form in which they arrive at the second transport stretch, that is either with the bank notes having uniformly arranged edges or with the bank notes in fan form. The second transport stretch can connect the first transport stretch with the assembly station or with the pass-through slot.

Further features and advantages of the invention will be apparent from the following description, which in combination with the accompanying drawings explain the invention by way of exemplary embodiments. The drawings are:

DETAILED DESCRIPTION OF THE INVENTION

Figure 1:
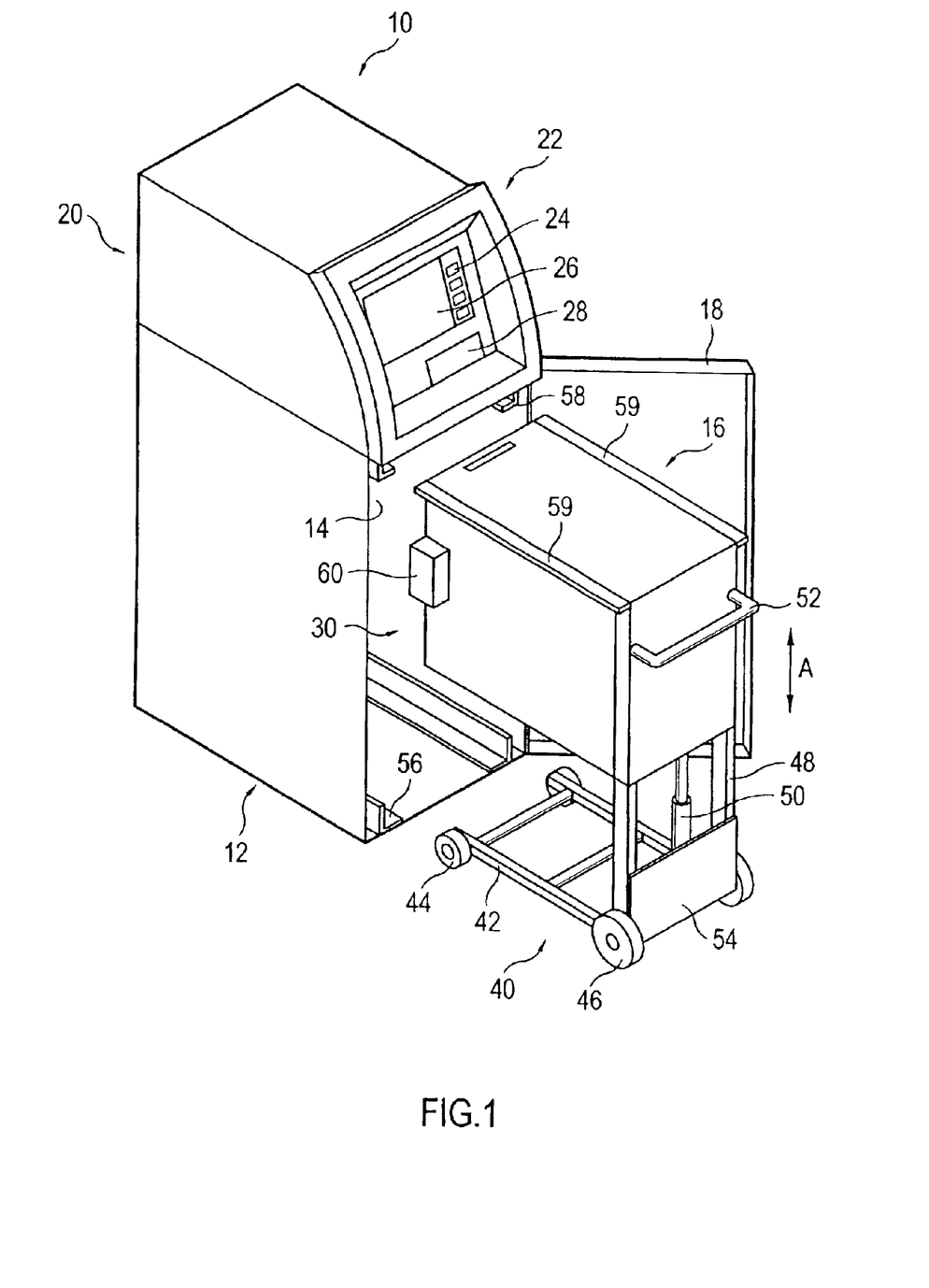
FIG. 1—a perspective schematic illustration of a cash dispenser embodying the invention with a bank note container in withdrawn condition, FIG. 2—a schematic vertical section through the cash dispenser of the invention with the bank note container in its pushed-in condition, FIG. 3—a schematic side view of a storage unit with a winding store, FIG. 4—a partially schematic plan view of a transport unit forming a bundle transport stretch in the process of transporting an aligned bank note bundle in the direction toward a dispensing compartment of the cash dispenser, FIG. 5—a view corresponding to FIG. 4 in the process of fanning a bank note bundle with transport of the same in the opposite transport direction, FIG. 6—a schematic side view of the transport unit illustrated in FIG. 4 taken along the line VI—VI in FIG. 4 for explaining a first drive train, and FIG. 7—a schematic section taken along the line VII—VII in FIG. 5 to explain the other drive train.

The cash dispenser illustrated in FIG. 1 includes a housing, indicated generally at 10, with a box like lower portion 12, which forms a receiving space 14 for a mobile strong box 16 and which is closable by a door 18.

In a housing upper portion 20 above the housing lower portion 12 are housed the necessary stationary functional units of the cash dispenser for the dispensing and the depositing of bank notes, which units will be described hereinafter so far as necessary. At the forward side of the upper portion 20 is a control panel 22 with various schematically indicated control elements 24, a display screen 26 and an output compartment 28. The control panel 22 can obviously have still further elements such as, for example, a compartment for the insertion of bank notes, a slot for the insertion of an identification card, and the like. These elements for the present invention play no role and are therefore not explained in greater detail.

Figure 2:
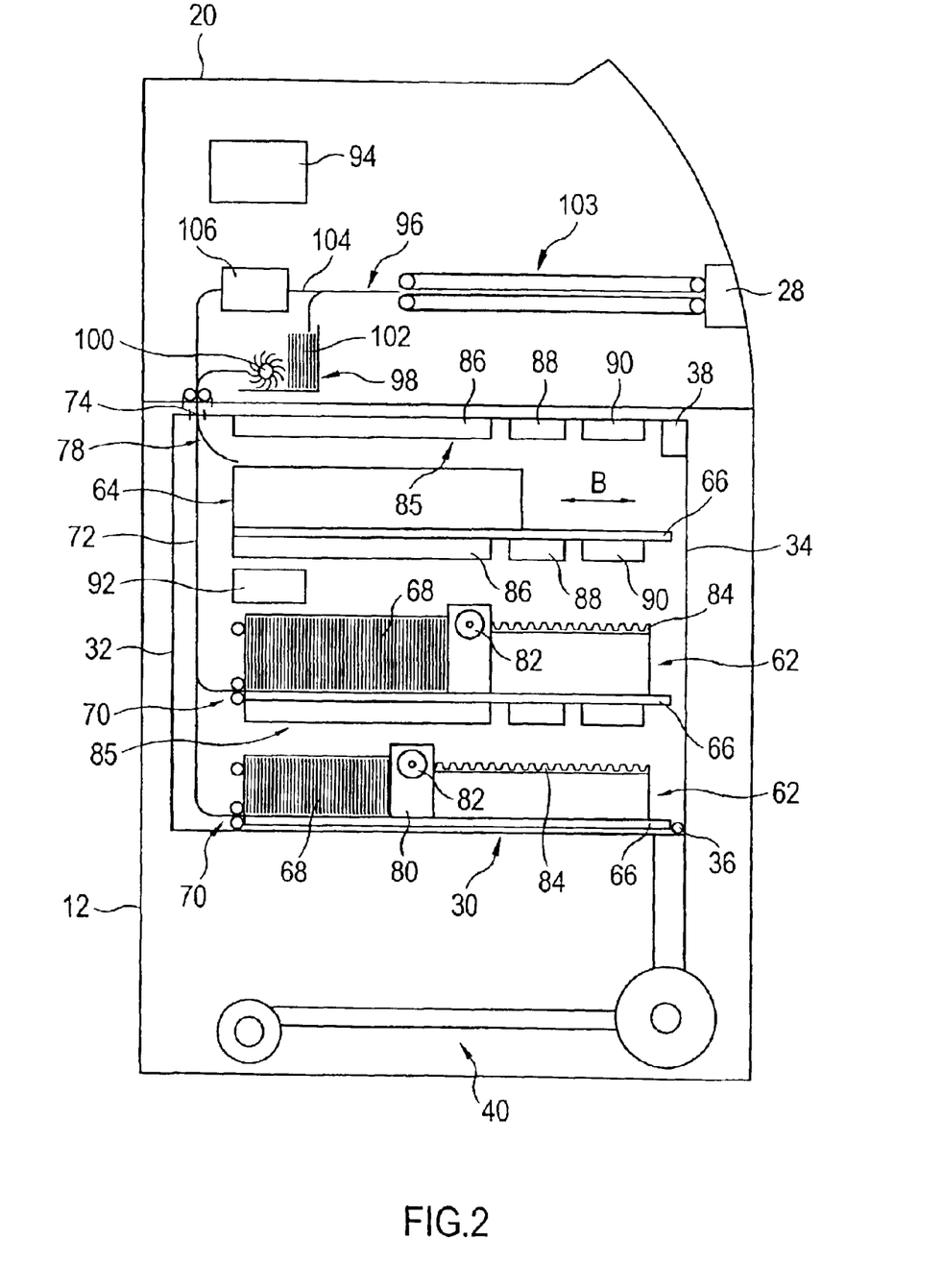

The mobile strong box 16 includes a box shaped container 30 with a container body 32 and a flap 34 which is connected to the container body 32 for pivotal movement about an axis 36 and which is lockable by a lock 38 (FIG. 2).

The container 30 is arranged on an undercarriage indicated, generally at 40, having a horizontal frame 42 with forward wheels 44 and rear wheels 46, as well as a vertical frame 48 extending upwardly from the rear wheels 46 on which the container 30 is guided for upward and downward adjustment in the direction of the double arrow A, so that the container is adjustable between a non-illustrated first position, in which it is lowered on the horizontal frame 42 and the upper position illustrated in FIG. 1. The upward movement of the container 30 can be assisted by a gas spring 50, which on one side is connected to the horizontal frame 42 and on the other side is connected to the outer side of the container 30. At the upper end of the vertical frame 48 is a bowed grip 52 which is arranged pivotally or removably on the vertical frame 48, so that after the insertion of the mobile strong box 16 into the receiving space 14 it can be folded downwardly or removed so as to not interfere with the closing of the door 16. On the undercarriage 40 the container 30 can be transported like a sack truck by a person. So that during transport over steps or during lowering over loading board walls the frame is not damaged, a strengthening plate 54 is arranged at the lower portion of the vertical frame 48 between the rear wheels 46.

Guide rails 56 are arranged in the receiving space 14 at the bottom of the housing lower portion 12 for guiding the undercarriage 40. Likewise, guide rails 58 are provided on the cover surface of the housing under portion 12, into which strips 59 provided on the container 30 are received, in order to so guide the container 30 during its insertion into the receiving space 14 that it will arrive exactly at the prescribed position inside of the housing 10, at which it is arrested by non-illustrated latching means.

On the outer side of the container 30 is arranged a connector 60 having terminals for the electric current supply and for the transmission of control signals and for contacting a non-illustrated complementary connector provided in the receiving space 14. The connector 60 is connected by power and control conductors with functional units inside of the container 30 and connects these functional units through the complementary connector in the receiving space 14 with functional units in the stationary portion of the cash dispenser.

The container 30 in the illustrated embodiment contains two storage units 62 for bank notes to be dispensed as well as a collecting container 64 for bank notes which had been prepared for a dispensing process, but for some reason were not handed out to customers. The storage units 62 as well as the collection container 64, generally called a rejection cassette, are formed as drawers and are guided on guide rails 66 so as to be shiftable in the direction of the double arrows B, so that they can be pulled out of the container body 32. The two storage units 62 each serve for receiving a stack 68 of bank notes, the forward end of which stack in the case of an entirely inserted drawer borders on a withdrawal and individualizing mechanism 70 by means of which, in a way known in an of itself, individual bank notes can be withdrawn from the stack 68. The individualizing mechanism 70 stand in connection with a vertical transport 72 which connects the individualizing mechanism with a pass-through slot 74 in the cover surface of the container 30. The vertical transport 72 is reversible in its transport direction and includes a deflector 78 by means which the bank notes which are inserted into the container 30 through the pass-through slot can be delivered to the rejection cassette 64.

In the drawer of each storage unit 62 is arranged a pressure slide 80 which presses on the bank note stack 68 in the direction toward the withdrawal and individualizing mechanism 70. The movement of the pressing slide 80 is achieved by a motor 82 arranged on the slide, the drive pinion of which meshes with a rack 84 fastened to the drawer.

Above each storage unit 62 and also above the reject cassette 64 there is included, at one of the guide rails 66, but arranged on an otherwise non-illustrated frame inside of the container 30, a bank note coloring unit 85 which has an ink or coloring material container 86 from which ink can be sprayed over the entire contents of the container by means of an explosion unit 88. The explosion unit 88 is triggered by a triggering unit 90. The triggering unit 90 can be activated and deactivated and responds in its activated condition to mechanical and electronic manipulation attempts upon the container 30. In connection with this, it is to be understood that all of the outer walls of the container 30 are included in the security mechanism. This can be accomplished by having the container wall made of glass fiber reinforced plastic material, in which a fine wire netting is embedded. This wire netting is so connected with the triggering unit 90, that any damage to the wire netting triggers the coloring unit.

Also located in the container 30 is a first control unit 92 which controls the drive for the withdrawing and individualizing mechanism 70 and the vertical transporter 72 as well as the deflector 78. This control unit 92 is connected through the connector 60 with a second control unit 94, which is arranged in the upper housing portion 20 of the cash dispenser (FIG. 2).

In the upper portion 20 of the housing is also arranged a bank note conveyor 96 which connects the pass-through slot 74 in the container 30 with the output compartment 28 of the control panel 22 of the cash dispenser. The bank note conveyor 96 includes a collection station 98 with a stacking wheel 100, for stacking the individual bank notes withdrawn from the storage unit 62 into a bundle 102 which bundle is then, through an output transport 103, tendered to a customer in the output compartment 28. The bank note conveyor 96 can also have a further transport stretch 104, through which the bank notes which are not removed from the output compartment 28 by a customer, after a pregiven time, are transported in the reverse direction and deposited into the reject cassette 64. In one embodiment of the invention the bank notes of the returned bundles are individualized by an individualizing mechanism 106 so that they can be transmitted individually through the pass-through slot 74 of the container 30 to the vertical transport 72 which by means of the deflector 78 delivers them to the reject cassette 64. In the same way, in principle, deposited bank notes of customers can be delivered to the storage unit 62 in order for them to be deposited in ordered form, that is in stacked form. This can be accomplished either by a suitable non-illustrated mechanism for guiding the bank notes to the storage unit 62 or by a suitable construction of the individualizing mechanism by a reversal of the transport direction of the individualizing elements. Then moreover the inserted bank notes, in a way known in itself, must pass through a non-destructive testing mechanism which checks the genuineness of the inserted bank notes and their external condition. Bank notes which do not pass this checking are either returned to the customer or are deposited in the reject compartment 64.

Figure 3:
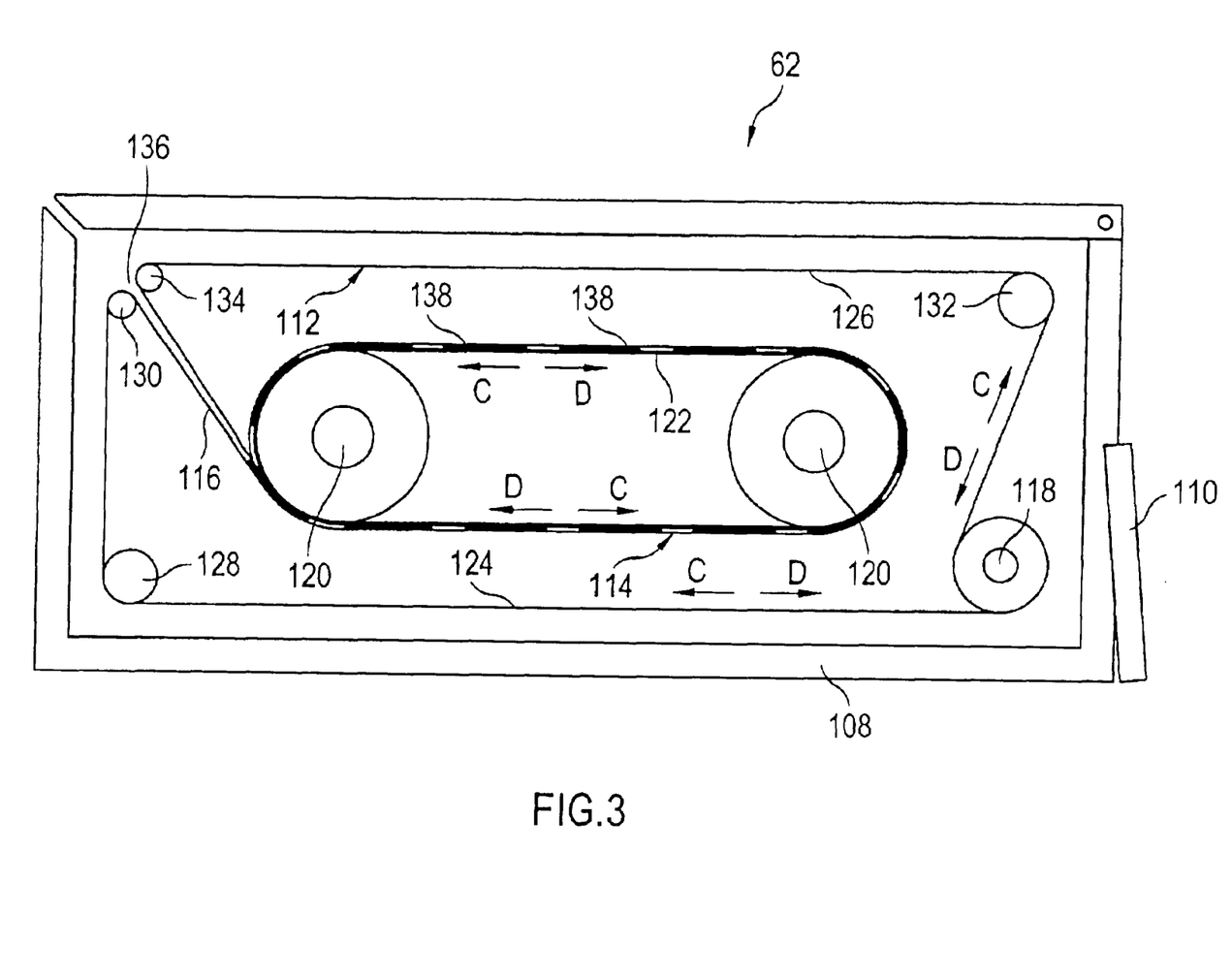

FIG. 3 shows an exemplary embodiment of a storage unit for the storing of bank notes, which is suited for both the dispensing as well as the ordered depositing of bank notes, without special individualizing or input mechanisms being necessary.

The storage unit illustrated in FIG. 3 contains a box shaped housing or a drawer 108, to the outer side of which is pivotally connected a hand grip 110. Inside of the drawer 108 is a winding store 112 with a winding core 114 and a double layered storage band 116, which can be wound from a supply roll 118 onto the winding core 114 or from the winding core 114 to the supply roll 118.

The winding core 114 includes two spools 120, which are arranged with their axes parallel to one another and at a spacing next to one another, so that the storage band running onto the winding core 114 forms a winding which in side view has the shape of a flattened oval. Advantageously, an endless band 122 is guided over both of the spools 120, which band passes over the circumferential portions of the spool 120 which are facing away from one another and forms a closed circumferential surface of the winding core 114 onto which the storage band 116 is wound.

The storage band 116 consist of two individual bands 124,126 with the individual band 124 being guided by deflecting rolls 128,130, and with the individual band 126 being guided over deflecting rolls 132,134, to the winding core 114. The deflecting rolls 130,134 together with the individual bands 124,126 forms a roll gap 136 through which bank notes 138 can be inserted between the individual bands 124,126 or from which the bank notes can be withdrawn from the winding store 112.

The supply roll 118 as well as at least one of the spools 120 is connected or coupable with a reversible drive, which is either arranged in the drawer 108 or outside of the drawer itself in the container 30, in which a latter case a corresponding coupling at the outer side of the drawer must be provided to couple the shaft of the supply roll 118 and the shaft of the involved spool 120 with the drive or drives.

For the storage of bank notes 138, they are inserted into the roller gap 136 and are grasped by the two individual bands 124,126 and are locked into the bands if these run in the direction of the arrow C from the supply roll 118 to the winding core 114, within this case one of the spools 120 or both of the spools 120 being driven, while the supply roll 118 freely, or as the case may be in a lightly braked condition, runs along with the spool. For the output of bank notes 138 the individual bands 124,126 run in the direction of the arrow D from the winding core 114 to the supply roll 118, so that the stored bank notes between the individual bands 124,126 are individually moved out of the roller gap 136. In this case, the supply roll 118 is driven, while the spools 120 run along with the supply roll in free or lightly braked condition. To minimize the mechanical requirements of the storage band 116, is it possible and also practical if the spools 120 and the supply roll 118 are constantly driven in common and in synchronism.

The previously described storage unit can be made relatively flat so that it can be easily and in spaced saving way be brought into cooperation with other storage units in the above-described container. The special advantage of the previously described storage unit exists in that without special measures bank notes cannot only be dispensed but can also be deposited whereas the depositing of bank notes in customary stacked cassettes is disproportionately more complicated, since the arranged depositing of bank notes in the form of a stack requires special technical measures. A further advantage of the described winding store with an elongated winding core exists in that the sections of the winding core 114 lying between the spools 120 the bank notes lie flatly. In the case of customary winding stores on the other hand, the bank notes are always bent. If they remain for a long time in the winding store, the bank notes retain this bent condition after their removal from the storage unit. Bent bank notes are, however, hard to handle in the automatic transport mechanisms of a cash dispenser or in their formation into bundles.

By way of FIGS. 4–7, an exemplary embodiment of the output transport 103 will now be described, which transport makes it possible to so reduce the thickness and stiffness of a bank note bundle that the bank notes can be transported through the pass-through slot 74 as a bundle to the reject cassette. The individualizing mechanism 106 can, in this example, be omitted.

The output transport 103 has a support frame 142 with two frame walls 144,146 parallel to one another. Between the frame walls 144,146 are arranged an upper belt drive 148 and a lower belt drive 150. The upper belt drive 148 includes two endless belts 152 each of which runs over a roll 154, rotatably fixed to a drive shaft 156 supported in the frame walls 144,146, and over a roll 158, which is freely rotatably supported on a shaft 160 supported in the frame walls 144,146. The lower belt drive 150 includes two endless belts 162 each of which runs over a roll 164, rotatably fixed to a drive shaft 166 supported in the frame walls 144,146, and a roll 168 which is freely rotatably supported on a shaft 170 supported in the frame walls 144,146. The lower runs of the endless belts 152 of the upper belt drive 148 cooperate with the upper runs of the endless belts 162 of the lower belt drive 150, so as to transport bank note bundles, as can be understood from FIGS. 6 and 7. Two further rolls 172 are arranged in rotatably fixed condition on the drive shaft 166 coaxially to the rollers 164, over each of which rollers 172 and endless belt 174 runs. The two endless belts 174 form a belt drive of the bank note transport stretch 104 and cooperate with a further belt drive, that is, with two further endless belts 176 each of which runs over an upper deflecting roll 178 which is rotatably fixedly supported on an intermediate shaft 180 supported by the frame walls 144,146. As one can see from a comparison between FIGS. 4 and 5 on one hand and between FIGS. 6 and 7 on the other hand, the bank notes which are guided between the endless belts 174 and 176 can be transferred to the belt drive 148 and 150. Likewise, the transfer can occur in the reverse direction.

Figure 6:
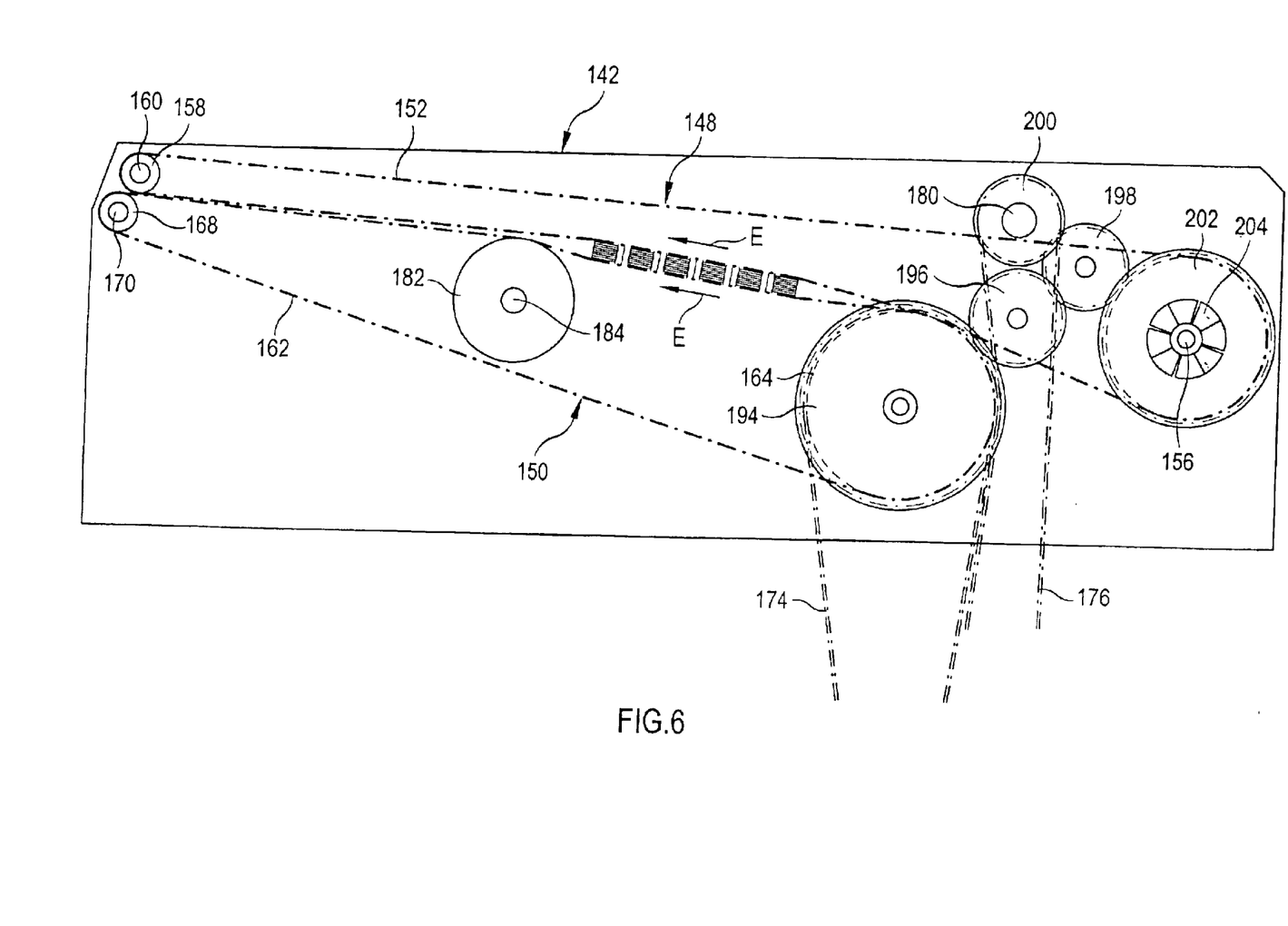
Figure 7:
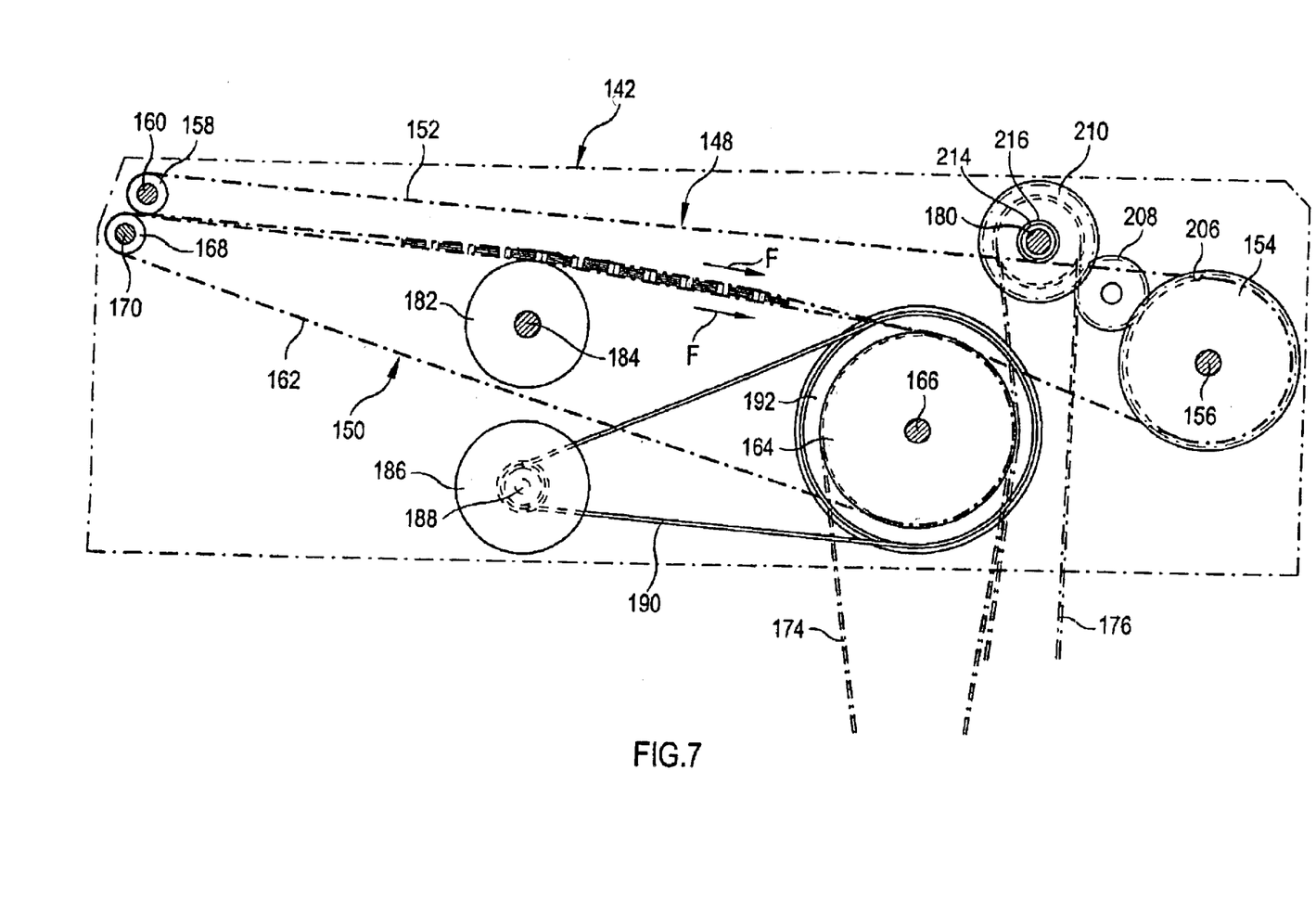

To avoid a sagging of the endless belts 152 and 162 of the horizontal output transport, the endless belts 162 of the lower belt drive 150 run over a support roll or support rolls 182, which likewise are rotated on a shaft 184 supported by the frame walls 144 and 146, as shown in FIGS. 6 and 7.

The drive of the belt drives of the output transport 103 and of the transport stretch 104 is achieved by a motor 186, arranged at the inner side of the frame wall 146, the drive wheel 188 of which lies at the outer side of the frame wall 144 and drives a drive wheel 192 rotatably fixed to the drive shaft 166 through a drive belt 190. The end of the drive shaft 166 which extends outwardly from the frame wall 146 and which is opposite from the drive wheel 192 carries a first gear wheel 194. This meshes with a first intermediate gear wheel 196 supported on the frame wall 146, which in turn drives a second intermediate gear 198 supported on the frame wall 146. The intermediate gear 198 in turn meshes with a second gear 200 rotatably fixedly connected with the intermediate shaft 180 and on the other hand with a third gear 202, which by way of a first one-way coupling 204, in the form of a latch free running one, is coupable with the drive shaft 156.

On one end of the drive shaft 156 projecting outwardly from the frame wall 144 is located a fourth gear wheel 206 rotatably fixed to the drive shaft 156, which gear 206 through a third intermediate gear wheel 208 supported on the frame wall 144 drives a fifth gear 210 which is coupable with the intermediate shaft 180 through a second one-way coupling 212, which is made as a slip coupling. The slip coupling consists of a brake disk 214 rotatably fixed to the intermediate shaft 180, against which brake disk 214 the gear wheel 210, which carries a brake layer 216, is pressed by a helical pressure spring 218.

The previous description shows that the drive shaft 166 of the lower belt drive 150 and the intermediate shaft 180 are driven in both rotational directions in common at the rotational speed determined by the motor rotational speed and the drive ratio. The drive shaft 156 of the upper belt drive 148, on the other hand, is driven in the one rotational direction in which the latching coupling 204 engages and therefore can convey a rotational moment from the gear wheel 202 to the drive shaft 156, through the gear wheel 194, the intermediate gear wheels 196 and 198, the gear wheel 202 and the one-way coupling 204 comprising drive train. Therefore if between the rotational speed of the intermediate shaft 180 and the gear wheel 210 which is driven through the intermediate gear wheel 208 from the gear wheel 206 located on the drive shaft 156, a difference occurs, this is taken up by the slip coupling 212.

In the opposite rotational direction, in which the one-way coupling 204 does not engage and therefore conveys no rotational moment from the gear wheel 202 to the drive shaft 156, the drive of the drive shaft 156 occurs through the guide train formed by the gear wheel 194, the intermediate gear wheels 196 and 198, the gear wheel 200, the intermediate shaft 180, the slip coupling 212, the gear wheel 210, the intermediate gear wheel 208 and the gear wheel 206.

Figure 4:
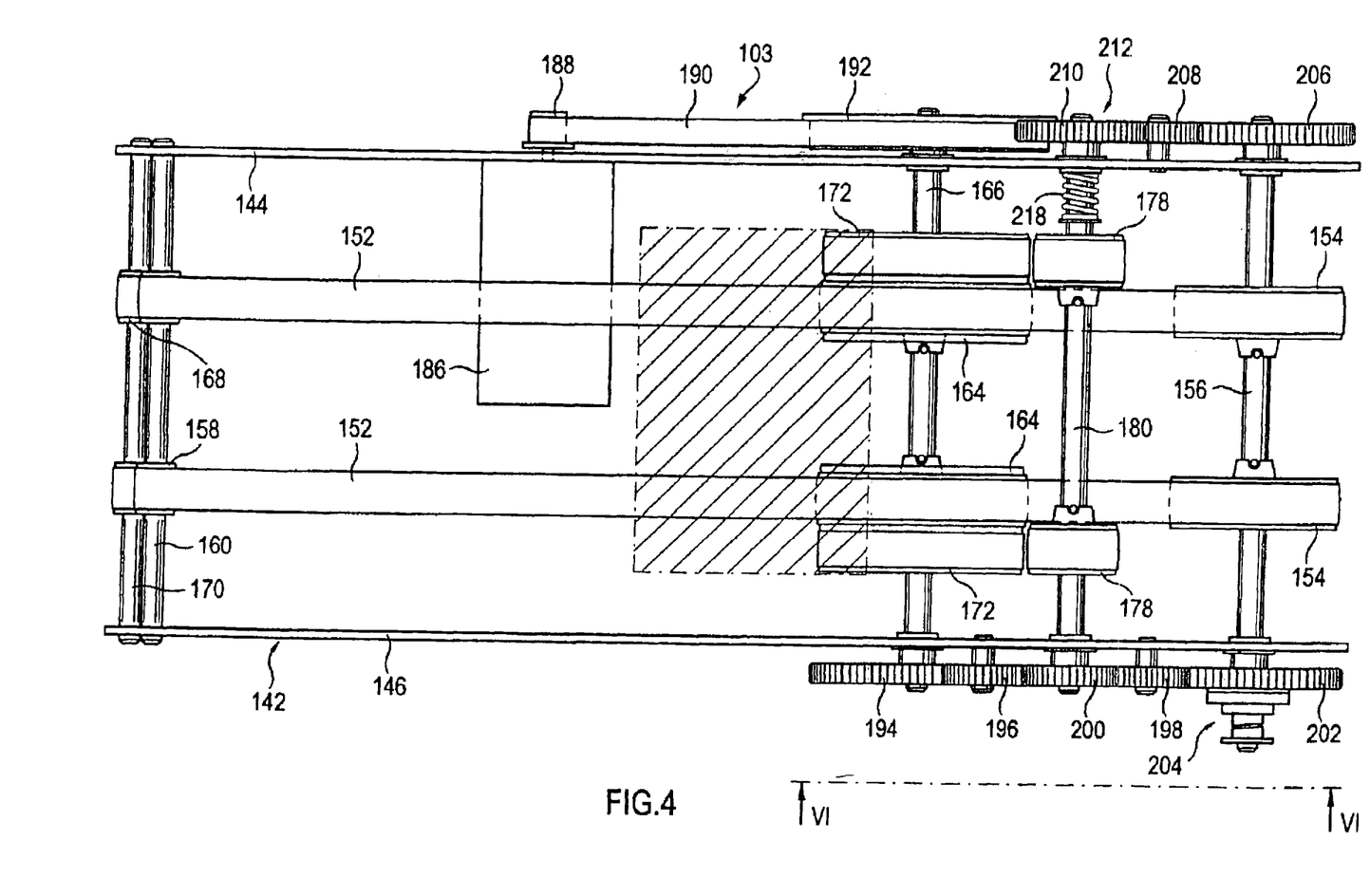
Figure 5:
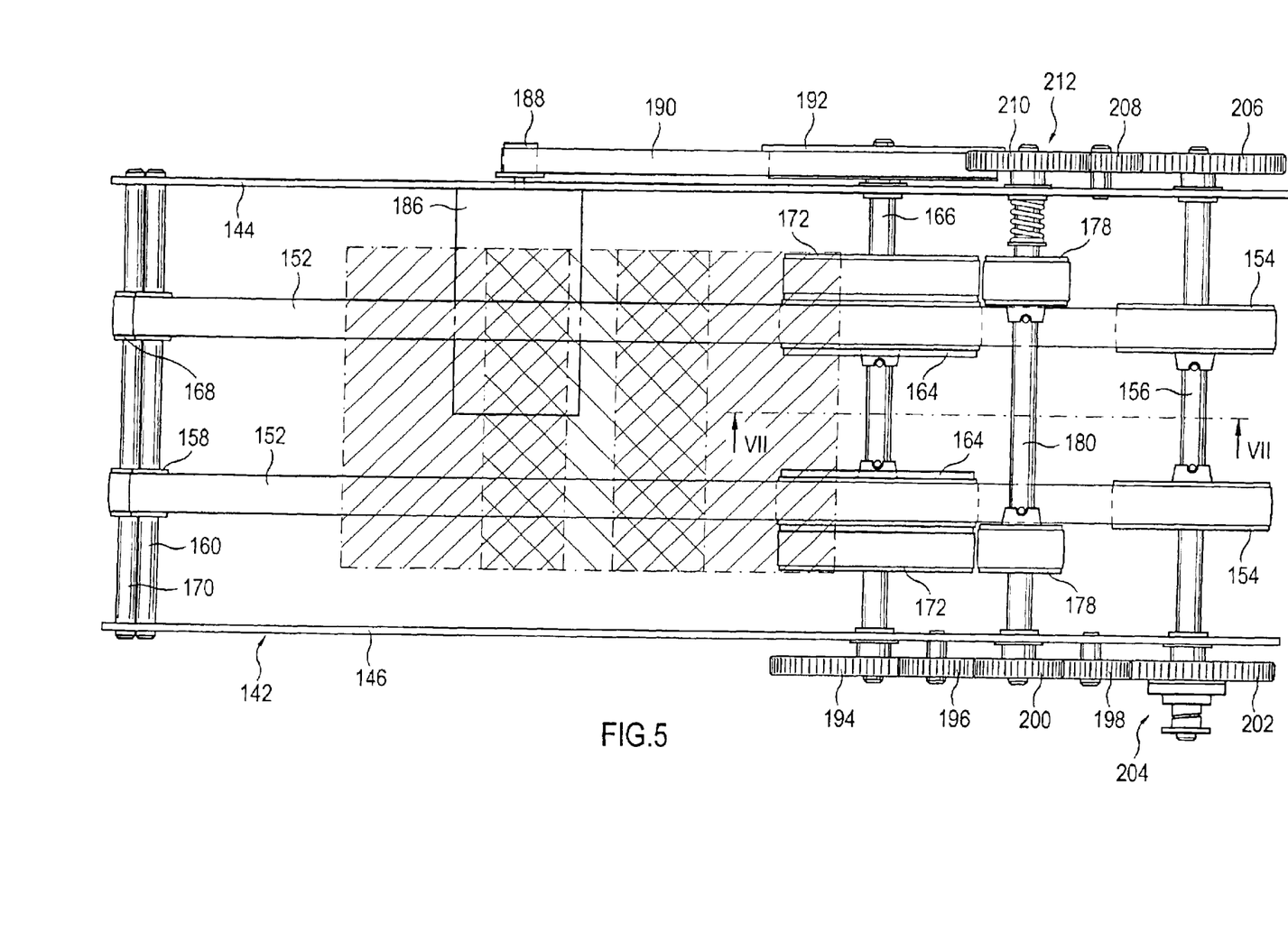

For the forward transport illustrated in FIGS. 4 and 6, whereby a bank note bundle with uniformly oriented bank note edges is to be transported in the direction of the arrow E to the output compartment 28 of the cash dispenser 10, the endless belts 152 of the upper belt drive 148 and the endless belts 162 of the lower belt drive 150 must run with exactly the same speed. If the bank note bundles on the other hand are to be transported from the output compartment 28 in a direction toward the reject cassette 64 according to FIGS. 5 and 7, in accordance with the invention the bank note bundle should be so removed from the compartment that the endless belt 152 of the upper belt drive 148 runs in the direction of the arrow F with a higher speed than the endless belt 162 of the lower belt drive 160.

The drive ratios in the second drive train are so chosen that the drive shaft 156 of the upper belt drive 148 runs with a higher speed than the drive shaft 166 of the lower belt drive 150. In the first drive train on the other hand the drive ratios are so chosen that the drive shafts 156 and 166 rotate at the same speed. The one-way coupling 204 is now so constructed that with a rearward moment of the bank note bundle, that is in the moment direction indicated by the arrow F, the free running condition of the one-way coupling 204 is effective, so that the drive shaft 156 of the upper belt drive 148 is rotated at the given higher rotational speed of the second drive train. In the forward direction indicated by the arrow E, on the other hand, the one-way coupling 204 is effective and provides a rotational moment transferring connection between the drive wheel 202 and the drive shaft 156. Since the rotational speed of the drive shaft 156 effected through the first drive train is smaller than the rotational speed effected through he second drive train, the drive shaft 156 is braked by the one-way coupling 204 in the forward movement. The rotational speed difference between the two drive trains is taken up through the slip coupling 212. By way of the belt drives 148 and 150 running at different speeds, the individual bank notes of the bank note bundles are pushed relative to one another in the movement direction, that is the bundles are fanned. Therefore, a bundle becomes entirely thinner and more flexible, so that it can be inserted through the pass-through gap 74 in the container 30 and can more easily be deflected. By changing the drive direction several times, this fanning can be increased so long as the bundle remains entirely within the transport stretch defined between the belt drives 148 and 150.

What is claimed is:

1. A cash dispenser for storing and dispensing bank notes comprising a housing defining a receiving space, at least one bank note storage unit, a withdrawal device associated with the storage unit for withdrawing individual bank notes from the storage unit, a bank note transport device for transport of the bank notes between the storage unit and a control panel of the cash dispenser, a power supply unit, a control device for controlling the functions of the cash dispenser, a closable and lockable box-shaped container within which are arranged the at least one bank note storage unit, the withdrawal device, a first bank note conveyor which connects the withdrawal device with a pass-through slot in a wall of the container, a drive for the withdrawal device and for the first bank note conveyor, a first control unit for controlling the functional units enclosed in the container, and a security mechanism, which upon unauthorized manipulation of the container makes invalid the bank notes disposed in the container, wherein the receiving space defined by the housing is formed to removably receive the container, the housing having a second bank note conveyor for connecting the pass-through slot of the container with the control panel as well as a second control unit for controlling the functions of the units connected to the housing, the container having an interface connected with the first control unit in the container for coupling the first control unit to the second control unit when the container is disposed in the receiving space, and wherein the container provides for the secure storage, and dispensing of bank notes.

2. A cash dispenser according to claim 1, wherein the interface connects the functional units disposed in the container to the power supply located in the housing of the cash dispenser.

3. A cash dispenser according to claim 2, wherein the container is arranged on an undercarriage and is guidable on the undercarriage between a lower transport position and a raised position, such that in the raised position it is insertable into the opening defined by the housing.

4. A cash dispenser according to claim 3, wherein the undercarriage further comprises a lift mechanism for lifting the container.

5. A cash dispenser according to claim 4, wherein the lift mechanism includes a gas spring.

6. A cash dispenser according to claim 3, wherein the housing further comprises at least one guide element disposed in the opening which cooperates with a complementary element on the container or the undercarriage.

7. A cash dispenser according to claim 1, wherein the container is provided with wheels.

8. A cash dispenser according to claim 1, wherein the container further comprises a container body and a flap movable relative to the container body, the flap including a lock for securing the flap in a closed position relative to the container.

9. A cash dispenser according to claim 1, wherein the security mechanism is triggerable by remote control.

10. A cash dispenser according to claim 1, wherein the security mechanism is contact freely activatable and deactivatable.

11. A cash dispenser according to claim 10, wherein the security mechanism is activatable after the filling of a bank note storage unit in a bank note loading station, remains uninterruptedly activated and is not deactivatable during the transport of the container to, and during its movement into and out of operation with, the housing as well as during return transport to the bank note loading station, and can only be deactivated in the bank note loading station.

12. A cash dispenser according to claim 1, wherein the security mechanism is activatable and deactivatable by the first control unit.

13. A cash dispenser according to claim 1, wherein the security mechanism further comprises a location transmitter.

14. A cash dispenser according to claim 1, wherein the drive units for the first and second bank note conveyors are reversible and the bank note storage unit is designed to both dispense and receive individual bank notes.

15. A cash dispenser according to claim 14, wherein the bank note storage unit has associated with it a device for the ordered input of bank notes into the storage unit.

16. A cash dispenser according to claim 1, wherein the bank note storage unit is adapted for the receipt of stacks of bank notes, and the withdrawal device includes an individualizing device for the bank notes.

17. A cash dispenser according to claim 1, wherein the storage unit includes a winding store having at least one storage band, which is windable between a supply roll and a winding core, the winding core and the supply roll being drivable by a winding drive, wherein the winding store dispenses and receives bank notes.

18. A cash dispenser according to claim 17, wherein the winding core has two spools which are axis parallel and spaced from one another with at least one of the spools being coupable with the winding drive, and with the storage band passing around both spools in common over circumferential areas of the spools which face away from one another.

19. A cash dispenser according to claim 18, wherein the two spools are surrounded by an endless band forming a circumferential shell of the winding core, onto which endless band the storage band is windable.

20. A cash dispenser according to claim 18, wherein the storage band includes two individual bands arranged to form as a double layer wound onto the supply roll and guided along separate paths to an output opening of the winding store where the two individual bands cooperate to form a bank note input/output gap, adjacent the input/output gap the two individual bands guided towards one another by deflecting rolls and wound as a double layer onto the winding core.

21. A cash dispenser according to claim 1, further comprising a collection compartment located inside the container for receiving bank notes therein.

22. A cash dispenser according to claim 21, wherein at least one of the bank note storage units and the collection compartment is a drawer insertable into the container.

23. A cash dispenser according to claim 22, wherein the drawer is guided on rails of a frame, the frame being disposed within the container.

24. A cash dispenser according to claim 22, wherein the bank note storage unit is adjustable for accommodating bank notes of various sizes.

25. A cash dispenser according to claim 22, wherein a bank note coloring or destroying unit is arranged above each drawer in the container.

26. A cash dispenser according to claim 1, wherein a collection station is disposed in the path of the second bank note conveyor for forming a bank note bundle from a plurality of bank notes withdrawn from the at least one bank note storage unit.

27. A cash dispenser according to claim 1, wherein the second bank note conveyor includes a first transport stretch having first and second belt drives, each belt drive including two endless belts arranged parallel to one another, the first and second belt drives arranged to cooperatively grip and transport a bank note bundle therebetween, the first transport stretch including a drive mechanism for driving each of the first and second belt drives in the same direction.

28. A cash dispenser according to claim 27, wherein both of the first and second belt drives are driven by a common motor, and one of the first and second belt drives in one transport direction is driven by a first drive train and in the other transport direction is driven by a second drive train which is coupable to the motor with a different drive ratio than the first drive train.

29. A cash dispenser according to claim 27, wherein the drive mechanism for the first and second belt drives includes an individually associated motor wherein the speed of at least one of the first and second belt drives is controllable.

30. A cash dispenser according to claim 29, wherein the first transport stretch is coupled with a second transport stretch having third and fourth belt drives, wherein an endless belt of one of the third and fourth belt drives is guided over the first drive roll of the first belt drive and the endless belt of the fourth belt drive is guided over a third drive roll which is located on the intermediate shaft.

31. A cash dispenser according to claim 30, wherein the second transport stretch connects the first transport stretch by way of a deflector with a collecting compartment located inside the container.

32. A cash dispenser according to claim 29, wherein the first transport stretch further comprises a first drive roll of the first belt drive and an intermediate shaft parallel to it are rotatably fixedly coupled with a motor and a second drive roll of the second belt drive stands in rotational moment transmitting connection with the first drive roll through a first one one-way coupling and with the intermediate shaft through a second one-way coupling wherein the effective direction of the second one-way coupling is opposite to that of the first one-way coupling.

33. A cash dispenser according to claim 32, wherein both of the first and second one-way couplings are loop spring couplings which are controlled by friction couplings with low rotational moment.

34. A cash dispenser according to claim 32, wherein one of the first and second one-way couplings is a latch-free running coupler.

35. A cash dispenser according to claim 34, wherein the second one-way coupling is a slip coupling.

36. A cash dispenser according to claim 32, wherein one of the first and second one-way couplings is a clamp body-free running coupler.

* * * * *

UNITED STATES PATENT AND TRADEMARK OFFICE
CERTIFICATE OF CORRECTION

PATENT NO. : 6,824,046 B2
DATED : November 30, 2004
INVENTOR(S) : Dirk Brexel et al.

It is certified that error appears in the above-identified patent and that said Letters Patent is hereby corrected as shown below:

<u>Title page,</u>
Item [73], Assignee, delete "Paderhorn" and subtitute -- Paderborn --.

<u>Column 14,</u>
Line 57, after "two individual bands", insert -- are --.

<u>Column 15,</u>
Line 25, after "which is", delete "coupable" and substitute -- couplable --.

<u>Column 16,</u>
Line 16, after "first" delete "one".

Signed and Sealed this

Fifth Day of April, 2005

JON W. DUDAS
*Director of the United States Patent and Trademark Office*